United States Patent
H'mimy et al.

(10) Patent No.: US 6,512,752 B1
(45) Date of Patent: Jan. 28, 2003

(54) ADAPTIVE CARRIER ASSIGNMENT IN MULTIPLE REUSE PATTERNS FOR PACKET DATA SYSTEMS BASED ON SERVICE TYPE AND USER LOCATION

(75) Inventors: Hossam H'mimy, Plano, TX (US); Anees Ahmedi, Irving, TX (US); Alan Triggs, Dallas, TX (US)

(73) Assignee: Ericsson Inc., Plano, TX (US)

( * ) Notice: Subject to any disclaimer, the term of this patent is extended or adjusted under 35 U.S.C. 154(b) by 0 days.

(21) Appl. No.: 09/475,627

(22) Filed: Dec. 30, 1999

(51) Int. Cl.$^7$ .............................. H04Q 7/00; H04B 7/00
(52) U.S. Cl. .................. 370/329; 455/450; 455/447; 455/513
(58) Field of Search ............................ 370/323, 328, 370/343, 344, 480, 329, 330, 331, 332, 333, 437; 455/450, 451, 452, 447, 464, 509, 513, 438, 439

(56) References Cited

U.S. PATENT DOCUMENTS

| | | | |
|---|---|---|---|
| 4,887,265 A | * | 12/1989 | Felix .......................... 370/333 |
| 5,038,399 A | * | 8/1991 | Bruckert ..................... 455/447 |
| 5,327,576 A | * | 7/1994 | Uddenfeldt et al. ........ 370/333 |
| 5,504,939 A | * | 4/1996 | Mayrand et al. ............ 455/450 |
| 6,269,086 B1 | * | 7/2000 | Magana et al. ............. 370/280 |
| 6,259,915 B1 | * | 7/2001 | Raith .......................... 455/434 |
| 6,295,453 B1 | * | 9/2001 | Desgagne et al. .......... 455/448 |
| 6,330,429 B1 | * | 12/2001 | He ............................. 455/67.1 |

FOREIGN PATENT DOCUMENTS

| | | |
|---|---|---|
| EP | 0 544 095 A1 | 6/1993 |
| WO | WO 94/08434 | 4/1994 |
| WO | WO 97/46038 | 12/1997 |

* cited by examiner

*Primary Examiner*—Nguyen T. Vo
*Assistant Examiner*—Duc Nguyen

(57) ABSTRACT

A system and method of assigning frequencies from a reuse group according to service type and subscriber location in a wireless communications network utilizing multiple reuse frequency groups for the assignment of transmission channels. Initially, a mobile station requests a transmission channel. A network element then receives the request and determines the data rate requirements of the mobile station for the level of service provided by the network to the mobile station. Concurrently, the signal strength from the mobile station to a serving base station subsystem is measured. The network element then assigns a frequency to the mobile station which belongs to a reuse frequency group that supports the data rate requirements at the signal strength measured.

22 Claims, 4 Drawing Sheets

ADAPTIVE CARRIER ASSIGNMENT IN MULTIPLE REUSE PATTERNS FOR PACKET DATA SYSTEMS BASED ON SERVICE TYPE AND USER LOCATION

TECHNICAL FIELD

The invention relates in general to wireless telecommunications networks and related applications and, in particular, to a method and system of assigning frequencies from a reuse group according to service type and subscriber location in a wireless communications network utilizing multiple reuse frequency groups for the assignment of transmission channels.

BACKGROUND OF THE INVENTION

Without limiting the scope of the invention, its background is described in connection with assigning frequencies from a reuse group according to service type and subscriber location, as an example.

Wireless communication technology has experienced unprecedented growth, fueled by advances in radio frequency, satellite, and microelectronic technologies, and by the convenience of access to telephony and portable wireless devices. Several technologies have emerged for providing wireless communications, including analog systems such as Advanced Mobile Phone System (AMPS), and digital systems such as Global System for Mobile Communications (GSM) and Digital AMPS (D-AMPS). Cellular radio systems operate in an interference-limited environment and typically rely on frequency reuse plans to maximize capacity and quality. Protocols such as Frequency Division Multiple Access (FDMA), in analog systems, and Time Division Multiple Access (TDMA), in digital systems, for example, are used for this purpose.

In packet data systems, however, the throughput is dependent on the Carrier-to-Interference (C/I) ratio in both CDMA and TDMA systems. That is, speech quality is measurable as a function of the Carrier-to-Interference (C/I) ratio as well as the Bit Error Rate (BER). In Generalized Packet Radio Services (GPRS) and EDGE systems, multiple coding and/or modulation schemes that provide a different throughput for different C/Is are used. Such schemes provide different degrees of link robustness that are inversely proportional to the throughput. In general, however, packet data users do not all have the same throughput requirements since different applications are in use, ranging from digital voice to high rate data transmissions. At the same, the throughput realized by a particular user depends largely on the user's position from the base station and hence C/I.

The network is designed to support multiple reuse patterns wherein frequency groups are created and reuse of the frequencies in a particular area is dictated in terms of cell distance. Consideration of the reuse pattern as a function of service quality has not, until the present invention, been contemplated. Therefore, a means of assigning frequencies from a frequency reuse group according to service type and subscriber location in the network would be advantageous.

SUMMARY OF THE INVENTION

The present invention provides a method and system of assigning frequencies from a reuse group according to service type and subscriber location in a wireless communications network utilizing multiple reuse frequency groups for the assignment of transmission channels.

Accordingly, disclosed in one embodiment is a method of assigning frequencies from a reuse group according to service type and subscriber location in a wireless communications network utilizing multiple reuse frequency groups or "patterns" for the assignment of transmission channels. The method comprises the step of a mobile station in the network requesting a transmission channel. Next, the request is received and the data rate requirements of the mobile station for the level of service provided by the network to the mobile station are determined. Concurrently, the signal strength from the mobile station to a serving base station subsystem is measured.

The method further comprises the step of assigning a frequency to the mobile station, where the frequency is one belonging to a reuse frequency group that supports the data rate requirements at the measured signal strength. In assigning frequencies, and according to one embodiment of the invention, frequencies from a low frequency reuse group are assigned to a mobile station user with low data rate requirements. Likewise, frequencies from a high frequency reuse group are assigned to a mobile station user with high data rate services requirements.

Distance from the base station subsystem that serves the mobile station may also be used in determining the frequency reuse group to select in assigning frequencies. As such, frequencies from a low frequency reuse group may be assigned to a high data rate user which is close in distance to the base station subsystem; or frequencies from a high frequency reuse group may be assigned to a low data rate user which is far in distance to the base station subsystem.

Technical advantages of the present invention include more efficient use of network resources as users with low data rate service requirements are assigned frequencies that support their needs, while high data rate users are assigned frequencies from high frequency reuse groups.

BRIEF DESCRIPTION OF THE DRAWINGS

For a more complete understanding of the present invention, including its features and advantages, reference is made to the following detailed description of the invention, taken in conjunction with the accompanying drawings of which.

Corresponding numerals and symbols in the figures refer to corresponding parts in the detailed description unless otherwise indicated.

DETAILED DESCRIPTION OF PREFERRED EMBODIMENTS

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the invention.

Figure 1:
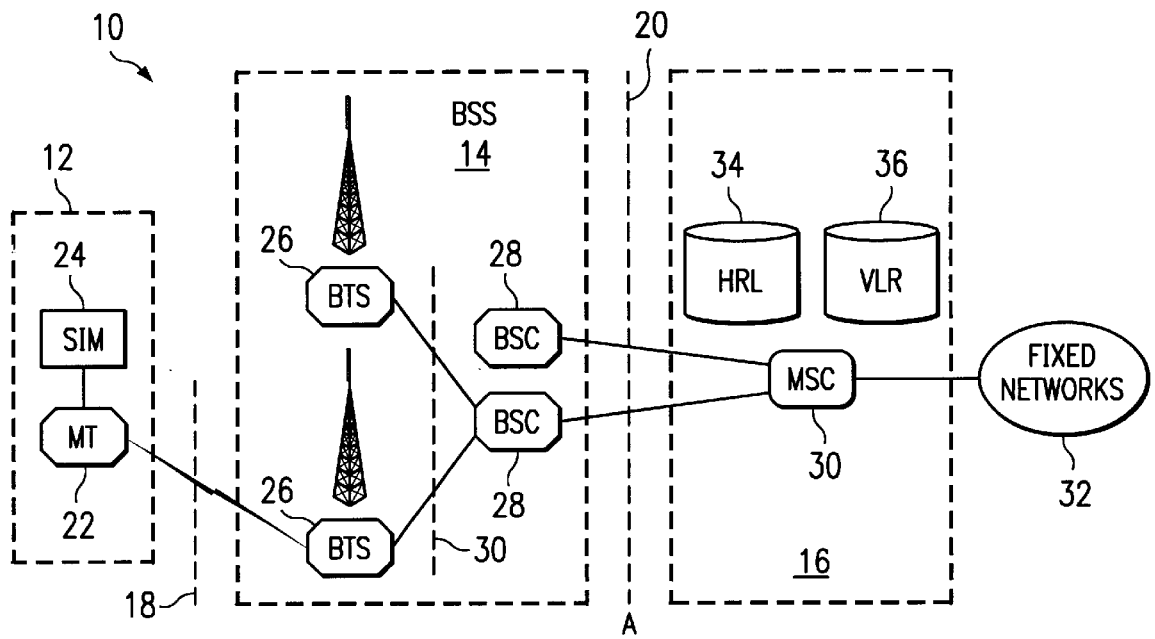
FIG. 1 illustrates a GSM network in which the present invention may be employed.

To better understand the invention, reference is made to FIG. 1, wherein a diagram of a typical GSM network, denoted generally as 10, in which a preferred embodiment of the present invention can be utilized. The mobile handset 12 comprises a mobile transceiver 22 of the type found in many cellular phonesets and a Subscriber Identity Module (SIM) 24. The SIM 24 contains an International Mobile Subscriber Identity (IMSI), or other similar identity indicator used to identify a user of the handset 12 on the GSM network 10. The SIM 24 may also include a secret key for authentication, and other relevant network/user information. Mobile transceiver 22 is uniquely identified by the International Mobile Equipment Identity (IMEI). The IMEI and the IMSI are independent, thereby allowing mobility of the user about the service area of the GSM network 10.

The Base Station Subsystem (BSS) 14 comprises two parts: the Base Transceiver Station (BTS) 26 and the Base Station Controller (BSC) 28. BTS 26 communicates across the standardized Abis interface 30 with BSC 28, allowing operation between components. BTS 26 houses radio transceivers that define a cell and handles the radio-link protocols with the mobile handset 12. In a large urban area, there may be a large number of BTSs 26 deployed. BSC 28 manages the radio resources for one or more BTSs 26, and, as such, there may be several BSCs 28 within a single BSS 14. Among the functions of the BSC 28 are radio-channel setup, frequency hopping, and handovers. BSC 28 provides a connection mechanism between the mobile handset 12 and the MSC 30 of network subsystem 16 which acts as the interface to one or more fixed networks 32.

The central component of the network subsystem 16 is the Mobile Switching Center (MSC) 30, which acts like a normal switching node of the Public Switched Telephone Network (PSTN), and provides all the functionality needed to handle a mobile subscriber, such as registration, authentication, location updating, handovers, and call routing to roaming subscribers. These functions are provided in conjunction with several other network entities, which together form the network subsystem 16.

The MSC 30 provides the connection mechanism to the fixed networks 32 which may include the PSTN or an Integrated Service Digital Network (ISDN), for example. The Home Location Register (HLR) 34 and Visitor Location Register (VLR) 36, together with the MSC 30 provide call routing and roaming capabilities for the GSM network 10. In particular, the HLR 34 contains administrative information of the subscriber registered in the corresponding GSM network 10, along with the current location of the mobile handset 12. Likewise, the VLR 36 contains selected administrative information from HLR 34 necessary for call control and provisioning of the subscriber services for each mobile currently located in the geographical area controlled by the VLR 36. Other registers are used for authentication and security functions within the network subsystem 16.

Because bandwidth and radio spectrum are limited resources shared by all users, a method is used by a GSM network 10 to divide the available network bandwidth among as many subscribers as possible. One method used in a GSM network 10 for this purpose is a combination Time and Frequency Division Multiple Access (TDMA/FDMA) method. For example, 25 MHZ bandwidth can be divided into 124 carrier frequencies spaced 200 kHz apart, with one or more carrier frequencies assigned to each BSS 14. Each of the carrier frequencies, in turn, can be divided in time using a TDMA scheme to define logical channels. Channels may be divided into dedicated subchannels which are allocated to a mobile handset 12, and common channels which are used by mobile handsets 12 in the idle mode.

Figure 2:
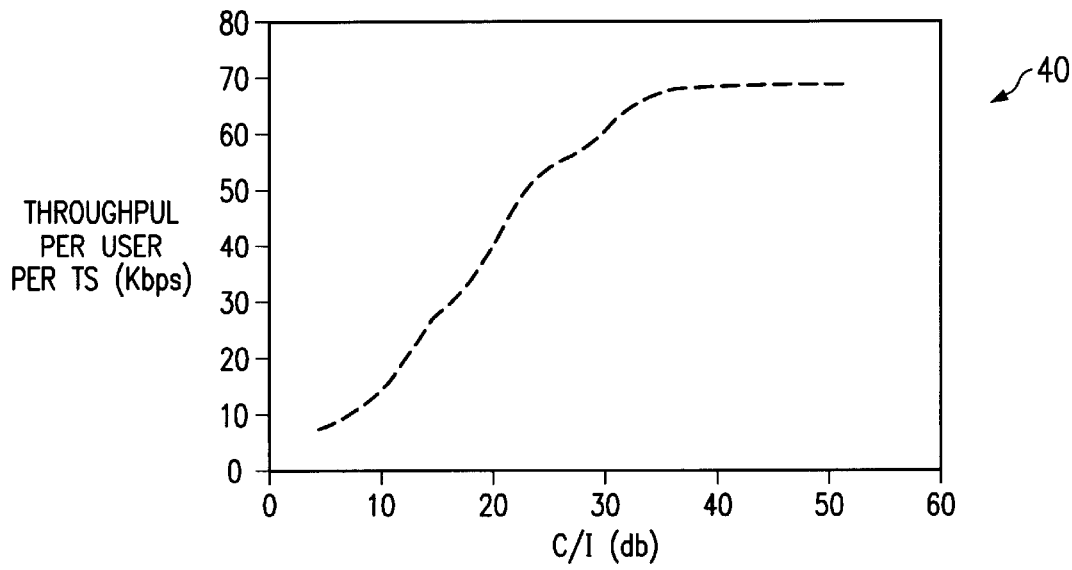
FIG. 2 illustrates throughput of packet data which depends on C/I (EDGE), in accordance with the present invention.

In packet data systems, the throughput is dependent on the C/I in both CDMA and TDMA systems. In GPRS and EDGE systems, multiple coding and/or modulation schemes that provide different throughput for different C/I can be used as shown in FIG. 2. FIG. 2, denoted generally as 40, illustrates throughput of packet data which depends on C/I. The multiple coding and/or modulation schemes provide different degrees of link robustness that are inversely proportional to the throughput. With proper selection of coding schemes, the system throughput and link robustness can be optimized.

Figure 3:
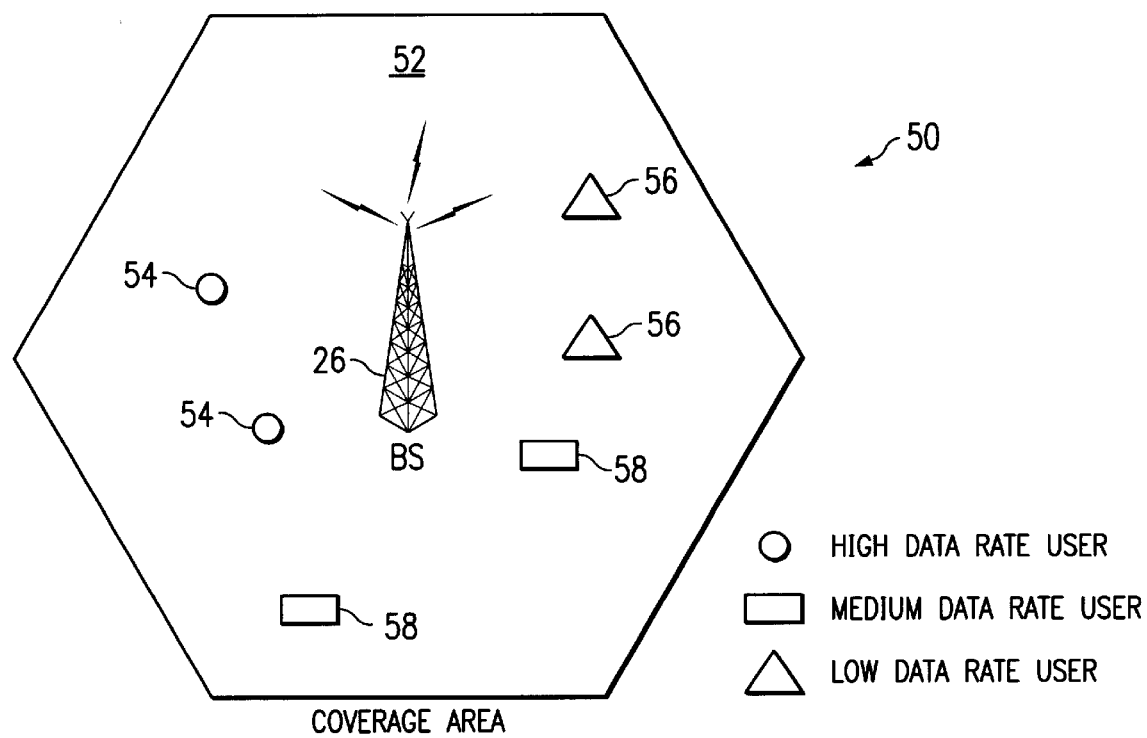
FIG. 3 illustrates coverage area for packet data services.

As illustrated in FIG. 3, not all packet data users in the coverage area 52 require the same level of data throughput. Packet data users include high data rate users 54, medium data rate users 58 and low data rate users 56. They each use different applications along the coverage area 52 for packet data services. Such applications range from voice transmissions utilized by low data rate users 56 to Internet data transmissions utilized by high data rate users 54. As such, the throughput provided to the user depends on its position, and hence C/I.

Figure 4:
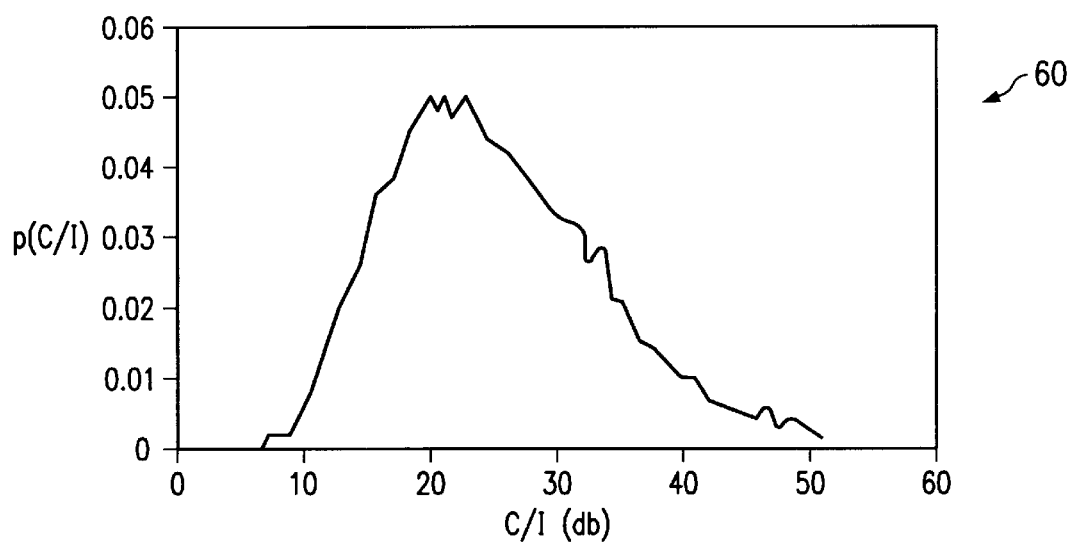
FIG. 4 is a diagram illustrating PDF of the C/I over the coverage area covered by 30BSs within a 4/12 reuse pattern, in accordance with a preferred embodiment of the present invention.
Figure 5:
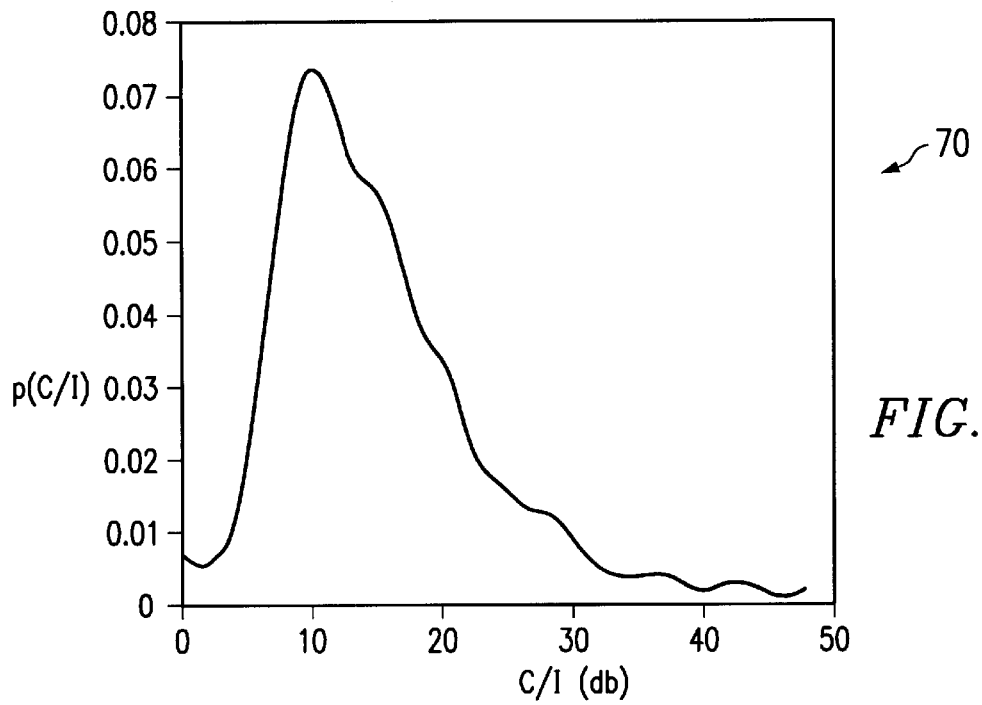
FIG. 5 is a diagram illustrating PDF of the C/I for the coverage area covered by 30BSs with 1/3 reuse pattern, in accordance with a preferred embodiment of the present invention.

In reuse patterns, for a fixed spectrum and fixed sector (e.g., 3), the higher the number of frequency groups, the lower the number of channels in a sector and the higher the C/I. As an example, take 2.4 MHz of spectrum with 3 sectors. The number of 200 KHz EDGE carriers per sector for a 4/12 reuse is 2400/(12*200)=1 Carrier. The number of EDGE carriers using 1/3 reuse is 2400/(3*200)=4 Carriers. The distributions of the C/I in 4/12 and 1/3 reuse plans are shown in FIGS. 4 and 5 respectively. It is clear that the C/I distribution of 1/3 is worse than that of 4/12 reuse plan.

Specifically, FIG. 4 is a diagram, denoted generally as 60, illustrating the Power Density Function (PDF) of the C/I over the coverage area covered by 30BSs with 4/12 reuse. FIG. 5 is a diagram 70 illustrating PDF of the C/I for the coverage area covered by 30BSs with 1/3 frequency reuse plan. By comparison, it is easy to see that the C/I distribution for a 1/3 reuse plan is worse than for a 4/12 frequency reuse plan.

Figure 6:
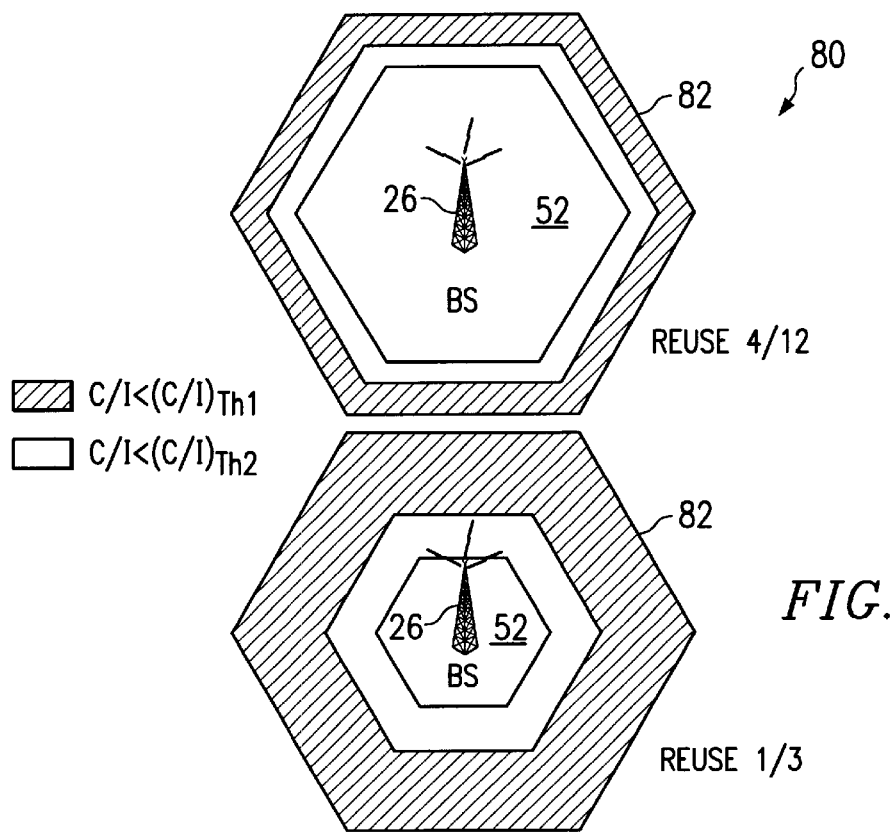
FIG. 6 illustrates C/I distribution for 1/3 and 4/12 reuse patterns, in accordance with the preferred embodiment of the present invention.

The present invention proposes combined reuse patterns (e.g., 1/3 and 4/12) serving the same coverage area 52, as shown in FIG. 6. Since the number of carriers for the low frequency reuse group patterns (i.e., 1/3) will be larger than the number of carriers for the high frequency reuse groups (i.e., 4/12), users with low data rate services can be assigned to the frequencies from the low frequency reuse group (i.e., 1/3). Likewise, high data rate users will be assigned frequencies from the high frequency reuse group (i.e., 4/12).

Another function that effects throughput and supported data rate for a user is the distance or signal strength from the user to the serving base station. The present invention contemplates the use of signal strength in assigning frequencies according to service type. As such, the high data rate users which are close to the base station can be assigned to the frequencies from the low frequency group reuse group (i.e., 1/3). This is determined once the signal strength has been measured so as to determine the location of the mobile user and its distance from the base station subsystem. By utilizing this algorithm, packet data channels will be utilized more efficiently by allocating low data rate users to reuse 1/3 instead of to reuse 4/12.

Figure 7:
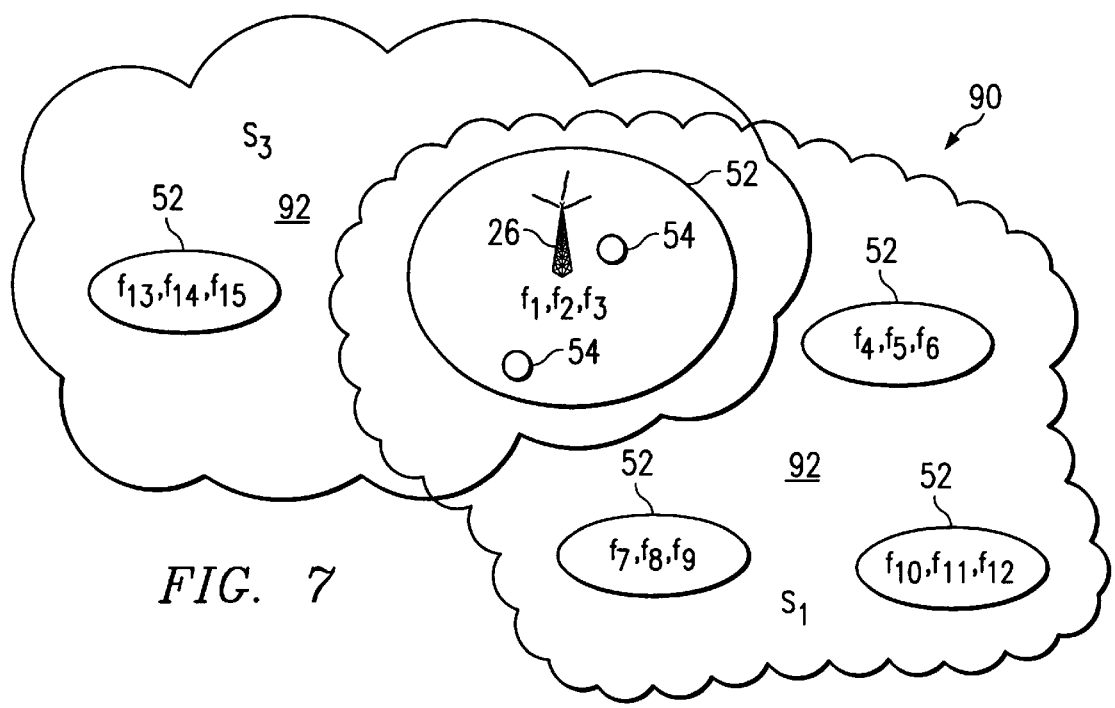
FIG. 7 illustrates coverage for reuse 1/3 overlayed with coverage for 4/12 reuse pattern, in accordance with the preferred embodiment of the present invention.
Figure 7:
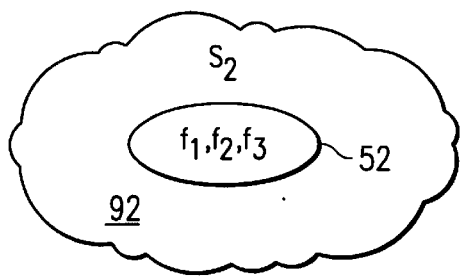

FIG. 7 illustrates coverage for a 1/3 reuse plan overlayed with coverage for a 4/12 reuse plan. Service area 92, or coverage area S1 includes four cells 52 with three sectors each. Each sector, thus, is assigned a frequency (i.e., $f_1$, $f_2 \ldots f_{12}$) for a frequency reuse pattern of 4/12. Service areas S2 and S3, on the other hand, comprises one cell 52 with three sectors and include frequencies $f_{13}$, $f_{14}$ and $f_{15}$ for a frequency reuse pattern of 1/3.

As previously discussed, distance affects the C/I ratio. The closer the mobile station user is to the base station, the less interference present. When the C/I ratio is greater, the networks allow for higher and faster data transmission. However, the further away the mobile station user is to the base station, the greater the interference and the lower the C/I. Therefore, the low reuse patterns (e.g., 1/3) will have a lower C/I (lower packet data throughput) and higher capacity. As the reuse pattern increases (e.g., 4/12), the C/I increases for higher throughput and reduced capacity.

The present invention is designed to allow mobile station users with low data rate services to be assigned frequencies from low frequency reuse groups (i.e., 1/3). In addition, high data rate users can be assigned to frequencies from high frequency reuse groups (4/12). These particular assignments depend on the service type and quality of service requirements.

In the alternative, high data rate users which are close to the base stations may be assigned to frequencies from the low frequency reuse group (i.e., 1/3). As illustrated in FIG. 7, cell 52 in service area 92 includes a high data rate user 54. This user, thus, is member of a high frequency reuse group (i.e., 4/12). Because the users 52 are close to the base station subsystem 26, frequencies from the low frequency reuse group in service area S3 may be assigned. This is determined by measuring the signal strength in order to identify the location of the user 52, as well as its distance from the base station subsystem.

Figure 8:
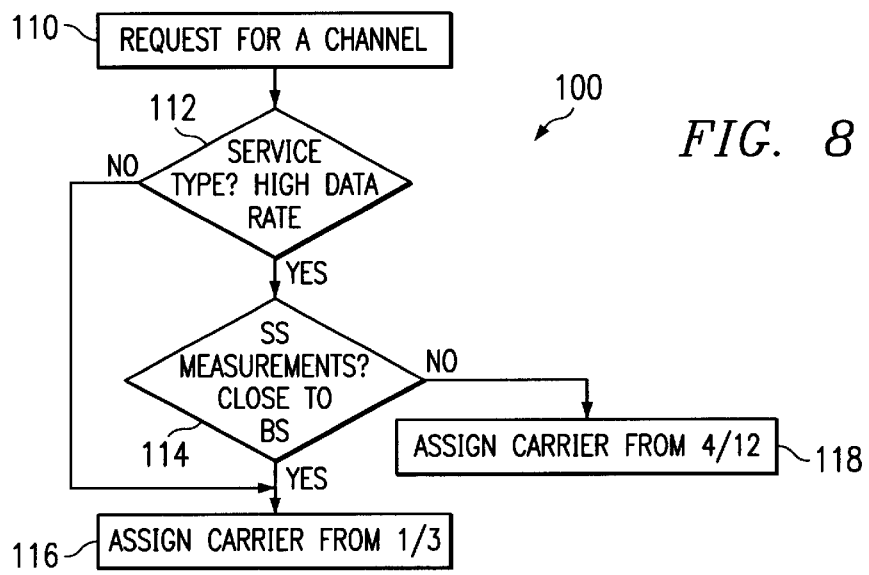
FIG. 8 is a high-level logic flow diagram illustrating process steps for implementing the method and system of the present invention, in accordance with a preferred embodiment.

FIG. 8 illustrates a high-level logic process flow diagram 100 illustrating process steps for implementing the method and system of the present invention, in accordance with a preferred embodiment of the present invention. It can be appreciated by those skilled in the art that FIG. 8, as illustrated and described herein, presents a self-consistent sequence of steps leading to a desired result. The steps are those requiring the physical manipulation of physical quantities. Usually, although not necessarily, these quantities take the form of electrical or magnetic signals capable of being stored, transferred, combined, compared, and otherwise manipulated.

It has proven convenient at times by those skilled in the art, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as "designating," "delivering" or "conveying", which are commonly associated with mental operations performed by a human operator. No such capability of a human operator is necessary or desirable in most cases of the operations described herein, which form part of the present invention. As indicated herein, these operations are primarily machine operations. Useful machines for performing operations of a preferred embodiment of the present invention include data-processing systems, such as a general-purpose digital computer or other similar devices. In all cases the distinction between the method of operations in operating a computer and the method of computation itself should be borne in mind.

The present invention relates to method steps for processing electrical or other (e.g. mechanical, chemical) physical signals to generate other desired physical signals, and can be implemented via a computer or microcomputer. However, it is not necessary to maintain within a computer memory of a mobile station, or cellular telephone subscriber unit, instructions implementing these method steps. Such instructions can be maintained within a computer memory location of a wireless telephone base station or at a central broadcasting center from which such base stations receive instructions. Implementation of the method described herein is left to the discretion of a particular wireless telephone system designer, whether cellular-based or otherwise.

It can be appreciated by those skilled in the art that the methods described herein can be implemented as a program product (e.g., a control program residing in a computer memory). The program product contains instructions that when executed on a CPU, carry out the operations depicted in the logic flow diagram of FIG. 4. While the present invention is described in the context of a fully functional telecommunications network 10, those skilled in the art will further appreciate that the present invention is capable of being distributed as a program product in a variety of forms. The present invention applies equally, regardless of the particular type of signal-bearing media utilized to actually carry out the distribution. Examples of signal-bearing media include recordable-type media, such as floppy disks, hard-disk drives and CD ROM's, and transmission-type media, such as digital and analog communication links.

Preferred implementations of the invention can include implementations to execute the method or methods described herein as a program product residing in a memory of microcomputer. Until required by a microcomputer, the set of instructions may be stored as a computer-program product in another computer memory. For example, the set of instructions may be stored as a computer-program product in a disk drive attached to a microcomputer (which may include a removable memory such as an optical disk or floppy disk for eventual use in the disk drive).

The computer-program product can also be stored at another computer and transmitted, when desired, to a user's workstation by an internal or external network. Those skilled in the art will appreciate that the physical storage of the sets of instructions physically changes the medium upon which it is stored so that the medium carries computer-readable information. The change may be electrical, magnetic, chemical, or some other physical change. While it is convenient to describe the invention in terms of instructions, symbols, characters, or the like, the reader should remember that all of these and similar terms should be associated with the appropriate physical elements.

Thus, as depicted at step 110 of FIG. 8, a request for a transmission channel is made by a mobile station. The request 110 is received by a network element which is capable of determining the data rate requirements at step 112 of the mobile station, as well as measuring the signal strength at step 114 from the mobile station to a serving base station subsystem.

Next, at step 112, the service type of the mobile station is identified by utilizing the transport later message which determines the profile of the mobile station user via the base station subsystem. If the service type is of high data rate, then the signal strength from the mobile station to a serving base station subsystem is measured at step 114. If, however, the service type is not of high data rate (i.e., low data rate), a carrier from 1/3 is assigned, at step 116, to the mobile user with low data rate. As such, the mobile user with low data rate services is assigned to frequencies from a low frequency reuse group.

The different reuse patterns have an effect on C/I distribution, and hence, on the throughput over the service area. The relationship between the throughput and the C/I allow for the assignment of a higher C/I where a high throughput, or higher quality of service, is required (i.e., Internet data transmission). Similarly, an assignment of a low C/I may be provided where a low throughput is required (i.e., voice transmission). Therefore, for example, reuse pattern 1/3 means that a lower throughput is required and a frequency from a reuse pattern of 1/3 may be assigned. As such, the mobile user making the request at step 110 will be assigned the frequency from a service area where one cell (i.e., "1") with three (i.e., "3") sectors will be reused due to the close proximity of the cells. Because these cells are close together, more co-channel interference is present. This results in low C/I and high capacity due to the higher number of channels available.

Alternatively, frequency reuse pattern of 4/12 means that a higher throughput is required and a frequency from a reuse pattern of 4/12 may be assigned. As such, the mobile user making the request at step 110 may be assigned the frequency from a service area where the cells will be reused every four (i.e., "4") cells with three sectors each (i.e., "12"). In this case, the distance between the co-channels is greater which yields less interference. This results in higher C/I, but capacity will be less than in that of reuse pattern 1/3. In short, the low reuse patterns (i.e., 1/3) will have lower C/I (lower packet data throughput) and higher capacity. As the reuse pattern increases (i.e., 4/12, 7/21, etc.), the C/I increases (higher packet data throughput) and the capacity is reduced. The tradeoff, thus, depends on service type and subscriber location for frequency assignment.

As illustrated at step 114, if step 112 does not yield a high data rate, the signal strength from the mobile station to a serving base station is then measured. The basic concept of assigning frequencies out of a reuse pattern is the quality of service. As such, the user can be anywhere in the cell. If the user is close to the base station, then the C/I is expected to be high. If, however, the user is far from the base station, the C/I is expected to be low. Therefore, by measuring the signal strength, the location of the mobile station user is known, as well as its distance from the base station. Thus, frequency can then be assigned based on its location.

As illustrated at step 114, if the signal strength measured yields a user close to the base station subsystem, the Carrier from the frequency reuse pattern 1/3 is assigned at step 116. If, however, the signal strength measured at step 114 is far from the base station subsystem, then the Carrier from the frequency reuse pattern 4/12 is assigned at step 118. Therefore, the frequencies assigned to the high data rate user which is far in distance to the base station subsystem are from a high frequency reuse group. In the alternative, frequencies from a high frequency reuse group may be assigned to a low data rate user which is far in distance to the base station subsystem, while frequencies from a low frequency reuse group may be assigned to a high data rate user which is close in distance to the base station subsystem.

Those skilled in the art can thus appreciate that the invention described herein explains a method and system for assigning frequencies from a reuse group according to service type and subscriber location in a wireless communications network utilizing multiple reuse frequency groups for the assignment of transmission channels. Utilizing the method and system described herein results in improvements in the performance of a telecommunications network, as well as optimizing the throughput or capacity by selecting channels from a cell that has different reuse patterns.

While this invention has been described with a reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. In a wireless communications network utilizing multiple reuse frequency groups for the assignment of transmission channels, a method of assigning frequencies from a reuse group according to service type and subscriber location comprising the steps of:

a mobile station requesting a transmission channel;

a network element receiving the request and determining the data rate requirements of the mobile station for the level of service provided by the network to the mobile station, and measuring the signal strength from the mobile station to a serving base station subsystem; and the network element assigning a frequency to the mobile station, said frequency belonging to a reuse frequency group that supports said data rate requirements at said signal strength.

2. The method according to claim 1 wherein said step of determining the data rate requirements further includes the step of utilizing the transport layer message to determine the service type via the base station subsystem.

3. The method according to claim 1 wherein said step of assigning a frequency to the mobile station further includes the step of assigning frequencies from a low frequency reuse group to a mobile station user with low data rate services.

4. The method according to claim 1 wherein said step of assigning a frequency to the mobile station further includes the step of assigning frequencies from a high frequency reuse group to a mobile station user with high data rate services.

5. The method according to claim 1 wherein said step of assigning a frequency further comprises the step of assigning frequencies from a low frequency reuse group to a high data rate user which is close in distance to the base station subsystem.

6. The method according to claim 1 wherein said step of assigning a frequency further comprises the step of assigning frequencies from a high frequency reuse group to a low data rate user which is far in distance to the base station subsystem.

7. In a wireless communications network utilizing multiple reuse frequency groups for the assignment of transmission channels, a system for assigning frequencies from a reuse group according to service type and subscriber location comprising:

a means for requesting a transmission channel;

a means for receiving the request and determining the data rate requirements of the mobile station for the level of service provided by the network to the mobile station, and measuring the signal strength from the mobile station to a serving base station subsystem; and a means for assigning a frequency to the mobile station, said frequency belonging to a reuse frequency group that supports said data rate requirements at said signal strength.

8. The system according to claim 7 wherein said means for requesting a transmission channel is performed by a mobile station.

9. The system according to claim 7 wherein said means for receiving the request and determining the data rate requirements is performed by a network element of the wireless communications network.

10. The system according to claim 7 wherein said means for determining the data rate requirements further comprises a means for utilizing the transport layer message to determine the service type via the base station subsystem.

11. The system according to claim 7 wherein said means for assigning a frequency to the mobile station further comprises a means for assigning frequencies from a low frequency reuse group to a mobile station user with low data rate services.

12. The system according to claim 7 wherein said means for assigning a frequency to the mobile station further comprises a means for assigning frequencies from a high frequency reuse group to a mobile station user with high data rate services.

13. The system according to claim 7 wherein said means for assigning a frequency further comprises a means for assigning frequencies from a low frequency reuse group to a high data rate user which is close in distance to the base station subsystem.

14. The system according to claim 7 wherein said means for assigning a frequency further comprises a means for assigning frequencies from a high frequency reuse group to a low data rate user which is far in distance to the base station subsystem.

15. In a wireless communications network utilizing multiple reuse frequency groups for the assignment of transmission channels, a program product for assigning frequencies from a reuse group according to service type and subscriber location comprising:

instruction means residing in a computer for requesting a transmission channel;

instruction means residing in a computer for receiving the request and determining the data rate requirements of the mobile station for the level of service provided by the network to the mobile station, and measuring the signal strength from the mobile station to a serving base station subsystem; and instruction means residing in a computer for assigning a frequency to the mobile station, said frequency belonging to a reuse frequency group that supports said data rate requirements at said signal strength.

16. The program product according to claim 15 wherein said instruction means for requesting a transmission channel is performed by a mobile station.

17. The program product according to claim 15 wherein said instruction means residing in a computer for receiving the request and determining the data rate requirements is performed by a network element of the wireless communications network.

18. The program product according to claim 15 wherein said instruction means residing in a computer for determining the data rate requirements further comprises instruction means residing in a computer for utilizing the transport layer message to determine the service type via the base station subsystem.

19. The program product according to claim 15 wherein said instruction means residing in a computer for assigning a frequency to the mobile station further comprises instruction means residing in a computer for assigning frequencies from a low frequency reuse group to a mobile station user with low data rate services.

20. The program product according to claim 15 wherein said instruction means residing in a computer for assigning a frequency to the mobile station further comprises instruction means residing in a computer for assigning frequencies from a high frequency reuse group to a mobile station user with high data rate services.

21. The program product according to claim 15 wherein said instruction means residing in a computer for assigning a frequency further comprises instruction means residing in a computer for assigning frequencies from a low frequency reuse group to a high data rate user which is close in distance to the base station subsystem.

22. The program product according to claim 15 wherein said instruction means residing in a computer for assigning a frequency further comprises instruction means residing in a computer for assigning frequencies from a high frequency reuse group to a low data rate user which is far in distance to the base station subsystem.

* * * * *